United States Patent
Baldwin

(10) Patent No.: US 9,955,308 B2
(45) Date of Patent: *Apr. 24, 2018

(54) METHOD AND APPARATUS FOR PROVIDING DIRECTIONAL PARTICIPANT BASED IMAGE AND VIDEO SHARING

(71) Applicant: AT&T Intellectual Property I, L.P., Atlanta, GA (US)

(72) Inventor: Christopher Baldwin, Algonquin, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,325

(22) Filed: Apr. 17, 2017

(65) Prior Publication Data

US 2017/0223505 A1 Aug. 3, 2017

Related U.S. Application Data

(63) Continuation of application No. 14/076,828, filed on Nov. 11, 2013, now Pat. No. 9,628,986.

(51) Int. Cl.
| | |
|---|---|
| *H04L 29/06* | (2006.01) |
| *H04W 4/02* | (2009.01) |
| *H04W 4/00* | (2018.01) |
| *H04N 5/232* | (2006.01) |
| *H04W 4/12* | (2009.01) |

(Continued)

(52) U.S. Cl.
CPC ....... *H04W 4/026* (2013.01); *H04L 29/08657* (2013.01); *H04L 63/0471* (2013.01); *H04N 5/232* (2013.01); *H04N 7/147* (2013.01); *H04W 4/008* (2013.01); *H04W 4/021* (2013.01); *H04W 4/023* (2013.01); *H04W 4/12* (2013.01)

(58) Field of Classification Search
CPC .. H04L 63/0471; H04W 4/021; H04W 4/025; H04W 4/026; H04W 4/008; H04W 4/12; H04W 5/232; H04W 12/02
See application file for complete search history.

(56) References Cited

U.S. PATENT DOCUMENTS

| | | | |
|---|---|---|---|
| 7,570,283 B2 * | 8/2009 | Sato | H04N 1/00281 348/211.2 |
| 7,831,512 B2 * | 11/2010 | Akadiri | G06Q 30/00 705/50 |
| 8,132,151 B2 | 3/2012 | Ahern et al. | |

(Continued)

FOREIGN PATENT DOCUMENTS

JP 2005267146 9/2005

*Primary Examiner* — Linglan E Edwards

(57) ABSTRACT

Methods for processing a media content are disclosed. For example, a method captures the media content, determines a direction from which the media content is captured, encrypts the media content, and sends the media content that is encrypted toward a receiving device in the direction from which the media content was captured. Another method captures the media content, determines a direction from which the media content is captured, encrypts the media content and uploads the media content that is encrypted to a data store. The method then sends a notification toward a receiving device in the direction from which the media content was captured. The notification identifies that the media content that is encrypted has been uploaded to the data store.

20 Claims, 4 Drawing Sheets

(51) Int. Cl.
*H04L 29/08* (2006.01)
*H04N 7/14* (2006.01)

(56) References Cited

U.S. PATENT DOCUMENTS

| | | |
|---|---|---|
| 8,189,927 B2 | 5/2012 | Steinberg |
| 8,194,940 B1 | 6/2012 | Kiyohara et al. |
| 8,270,684 B2 | 9/2012 | Kiyohara et al. |
| 8,319,837 B2 | 11/2012 | Shin et al. |
| 8,340,653 B2 | 12/2012 | Shimagaki |
| 8,401,249 B2 | 3/2013 | Murakami |
| 8,433,759 B2* | 4/2013 | Styles ............... G06F 3/017 455/456.3 |
| 8,442,221 B2 | 5/2013 | Ming |
| 8,520,907 B2 | 8/2013 | Lai |
| 8,560,625 B1 | 10/2013 | Hardman et al. |
| 8,787,580 B2* | 7/2014 | Hodges ......... H04N 1/00132 380/277 |
| 9,270,700 B2* | 2/2016 | Medvinsky ......... H04W 12/08 |
| 2004/0228503 A1 | 11/2004 | Culter |
| 2006/0187921 A1* | 8/2006 | Iwasaki ......... H04N 1/00127 370/389 |
| 2006/0190401 A1 | 8/2006 | Akadiri |
| 2009/0208068 A1 | 8/2009 | Tsunoda |
| 2009/0220093 A1 | 9/2009 | Hodges et al. |
| 2009/0287853 A1* | 11/2009 | Carson ............... H04W 4/02 710/16 |
| 2010/0141778 A1* | 6/2010 | Basson ............... H04N 5/232 348/207.1 |
| 2010/0144273 A1 | 6/2010 | Yusuke et al. |
| 2010/0287053 A1 | 11/2010 | Ganong et al. |
| 2011/0013810 A1 | 1/2011 | Engstrom |
| 2011/0043643 A1 | 2/2011 | Yu et al. |
| 2011/0064281 A1 | 3/2011 | Chan |
| 2011/0081923 A1* | 4/2011 | Forutanpour ......... G06F 1/1694 455/457 |
| 2011/0083111 A1* | 4/2011 | Forutanpour ......... G06F 1/1694 715/863 |
| 2011/0122275 A1* | 5/2011 | Kawai ................ G11B 27/28 348/222.1 |
| 2011/0256907 A1 | 10/2011 | Lee et al. |
| 2011/0283334 A1* | 11/2011 | Choi ................ G06F 3/04883 725/148 |
| 2011/0289147 A1* | 11/2011 | Styles ............... G06F 1/1613 709/205 |
| 2012/0036132 A1 | 2/2012 | Doyle |
| 2012/0086792 A1 | 4/2012 | Akbarzadeh et al. |
| 2012/0098999 A1 | 4/2012 | Chen |
| 2012/0158846 A1 | 6/2012 | Linder |
| 2012/0242840 A1 | 9/2012 | Nakfour et al. |
| 2012/0250950 A1 | 10/2012 | Papakipos et al. |
| 2012/0294495 A1 | 11/2012 | Wren |
| 2012/0314917 A1 | 12/2012 | Kiyohara et al. |
| 2012/0317484 A1 | 12/2012 | Gomez et al. |
| 2013/0013683 A1 | 1/2013 | Elliott |
| 2013/0100306 A1* | 4/2013 | Bekiares ......... G08B 13/19689 348/211.99 |
| 2013/0101181 A1 | 4/2013 | Hsi |
| 2013/0148003 A1 | 6/2013 | Penev et al. |
| 2013/0204956 A1 | 8/2013 | Shimoda |
| 2013/0243250 A1* | 9/2013 | France ............... G01C 15/00 382/103 |
| 2014/0059070 A1 | 2/2014 | Harrori et al. |
| 2014/0280609 A1 | 9/2014 | Averbeck |

* cited by examiner

METHOD AND APPARATUS FOR PROVIDING DIRECTIONAL PARTICIPANT BASED IMAGE AND VIDEO SHARING

This application is a continuation of U.S. patent application Ser. No. 14/076,828, filed Nov. 11, 2013, now U.S. Pat. No. 9,628,986, which is herein incorporated by reference in its entirety.

The present disclosure relates generally to communication networks and, more particularly, to systems and methods for supporting and enabling sharing of media among participants.

BACKGROUND

Wireless network providers currently enable users to capture media on wireless endpoint devices and to share the media with others. For example, many mobile phones are now equipped with integrated digital cameras for capturing still pictures and short video clips. In addition, many mobile phones are equipped to also store audio recordings. Wireless network providers, e.g., cellular network providers, allow users to send picture, video or audio messages to other users on the same wireless network or even on different networks. In addition, users may share media more directly with one another via peer-to-peer/near-field communication methods. For example, the user may send pictures or video as email attachments, multimedia messages (MMS), or may send a link with a uniform resource locator (URL) for the location of the media via email or instant message to others. However, the user must know beforehand the others with whom the user wishes to share the media and must know how to reach the others, e.g., via an email address, telephone, mobile phone number, etc.

SUMMARY

In one embodiment, the present disclosure discloses a method for processing a media content. For example, the method captures the media content, determines a direction from which the media content is captured, encrypts the media content, and sends the media content that is encrypted toward a receiving device in the direction from which the media content was captured.

In another embodiment, the present disclosure discloses an additional method for forwarding a media content. For example, the method captures the media content, determines a direction from which the media content is captured, encrypts the media content and uploads the media content that is encrypted to a data store. The method then sends a notification toward a receiving device in the direction from which the media content was captured. The notification identifies that the media content that is encrypted has been uploaded to the data store.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media and devices for processing media content. Although the present disclosure is discussed below in the context of cellular and wireless access networks and an Internet Protocol (IP) network, the present disclosure is not so limited. Namely, the present disclosure can be applied to packet switched or circuit switched networks in general, e.g., Voice over Internet Protocol (VoIP) networks, Service over Internet Protocol (SoIP) networks, Asynchronous Transfer Mode (ATM) networks, Frame Relay networks, and the like.

In one embodiment, a media content, such as an image or a video, is captured by a mobile endpoint device equipped with a camera, and is transmitted to all devices in a particular direction (or field of view) of the camera at the time when the media content is captured. In one embodiment, the media content is encrypted prior to the transmission, where an encryption key may be provided to intended recipients at any time before, during or after the encrypted media content is transmitted. Notably, in one example, the media content is transmitted using a peer-to-peer and/or near-field communication technique such as Bluetooth, Wi-Fi/IEEE 802.11, infrared, free-space optical, and so forth. However, the encryption key may be sent via a different channel, such as via a cellular network and/or one or more other networks.

In another example, the endpoint device uploads the encrypted media content to a network-based data store. In this case, the endpoint device only transmits a notification which indicates that the media content has been uploaded to the data store. Thus, the devices of one or more of the participants in the media who receive this notification may retrieve the media content from the data store if the participants so choose. However, the transmission and reception of the encryption key is still performed via the communication network such that only intended recipients who receive the notification may subsequently access the media content from the network-based data store.

Figure 1:
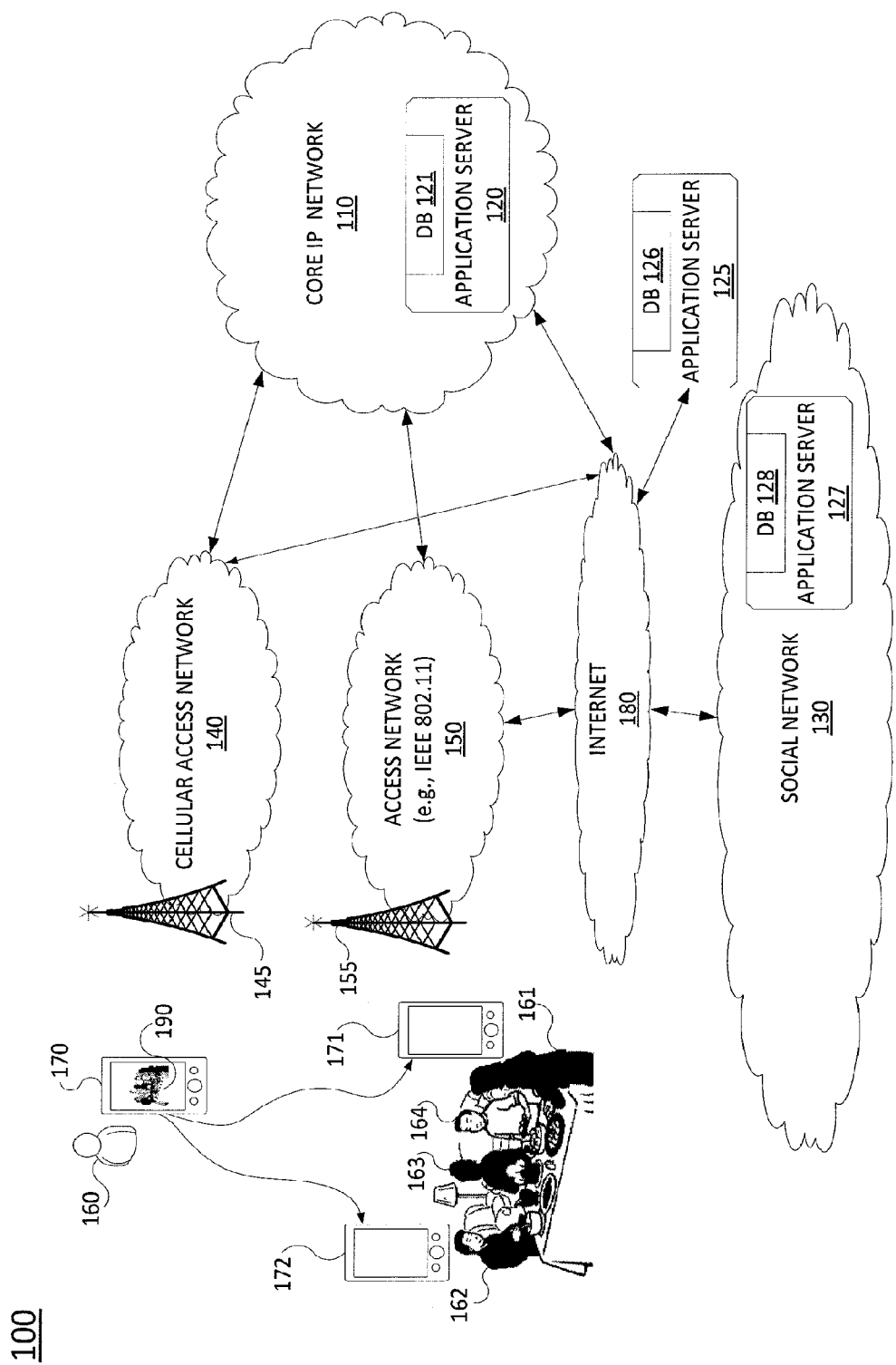
FIG. 1 illustrates an exemplary network related to the present disclosure.

To better understand the present disclosure, FIG. 1 illustrates in greater detail an exemplary system 100 suitable for performing or enabling the steps, functions, operations and/or features described herein. The overall communication network 100 may include any number of interconnected networks which may use the same or different communication technologies, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and so forth. It should be noted that an IP network is broadly defined as a network that uses Internet Protocol to exchange data packets.

As shown in FIG. 1, the system 100 connects endpoint devices 170, 171 and 172 with one another and with one or more application servers 120, 125 and/or 127 via a core internet protocol (IP) network 110, a cellular access network 140, an access network 150 and/or Internet 180. The system 100 also includes a social network 130 for providing social network profile information regarding members in the social network.

In one embodiment, access network 150 may comprise a non-cellular access network such as a wireless local area network (WLAN) and/or an IEEE 802.11 network having a wireless access point 155, a "wired" access network, e.g., a local area network (LAN), an enterprise network, a metropolitan area network (MAN), a digital subscriber line (DSL) network, a cable network, and so forth. As such, endpoint devices 170, 171 and/or 172 may each comprise a mobile device, e.g., a cellular device and/or a non-cellular wireless device, a device for wired communication, and so forth. For example, endpoint devices 170, 171 and 172 may each comprise one of: a mobile phone, smart phone, email device, tablet, messaging device, Personal Digital Assistant (PDA), a personal computer, a laptop computer, a Wi-Fi device, a tablet, a server (e.g., a web server), and so forth. In one embodiment, one or more of endpoint devices 170, 171 and/or 172 are equipped with digital cameras, video capture devices and/or a microphones or other means of audio capture/recording in order to support various functions described herein.

In one embodiment, cellular access network 140 may comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, cellular access network 140 may comprise an access network in accordance with any "second generation" (2G), "third generation" (3G), "fourth generation" (4G), Long Term Evolution (LTE) or any other yet to be developed future wireless/cellular network technology. While the present disclosure is not limited to any particular type of wireless access network, in the illustrative embodiment, wireless access network 140 is shown as a UMTS terrestrial radio access network (UTRAN) subsystem. Thus, element 145 may comprise a Node B or evolved Node B (eNodeB). However, in some instances element 145 may be referred to conventionally as simply a base station.

In one embodiment, core IP network 110 comprises, at a minimum, devices which are capable of routing and forwarding IP packets between different hosts over the network. However, in one embodiment, the components of core IP network 110 may have additional functions, e.g., for functioning as a public land mobile network (PLMN)-General Packet Radio Service (GPRS) core network, for proving Voice over Internet Protocol (VoIP), Service over Internet Protocol (SoIP), and so forth, and/or may utilize various different technologies, e.g., Asynchronous Transfer Mode (ATM), Frame Relay, multi-protocol label switching (MPLS), and so forth. Thus, it should be noted that although core IP network 110 is described as an internet protocol network, this does not imply that the functions are limited to IP functions, or that the functions are limited to any particular network layer (e.g., the internet layer). In one embodiment, the access networks 140 and 150 and the core network 110 may be operated by different service providers, the same service provider or a combination thereof. Various interconnections between access networks 140 and 150, core network 110, Internet 180 and social network 130 are shown. In accordance with the present disclosure, it is contemplated that devices may utilize any one or a combination of such networks and interfaces in order to communicate with one another.

FIG. 1 also illustrates a number of people at an event or gathering. For example, user 160 and participants 161-164 may be attendees at the event. As also illustrated in FIG. 1, user 160 may take a photograph 190 (or video) of participants 161-164 using his/her mobile endpoint device 170. As shown, the photograph 190 may capture images of participants 161-164. Notably, user 160 may then desire to share the photograph 190 with one or more of the participants in the photograph. If the user 160 is close friends with the participants to whom he or she desires to send the photograph, the user 160 may have no difficulty in sending the photograph as an MMS message or as an attachment to an email, since user 160 likely has contact information to send the photograph to these participants. However, if the gathering is very large, or if one or more of the participants are friends-of-friends that the user 160 may have only recently met, it is more difficult for user 160 to share the photograph with the other participants in the photograph. For example, user 160 may be close friends with and/or already have contact information for participant 161.

On the other hand, user 160 may have met participant 162 for only the first time at this event. Of course user 160 could simply ask participant 162 for his or her phone number or email address and send the photograph to participant 162 in the same manner as the photograph is sent to participant 161, e.g., in a conventional way. However, even where user 160 has previously obtained contact information of a participant, e.g., where the participant is a close friend, it is often time consuming to create a message for sending a photograph or other media content such as a video recording, an audio recording and so forth. It is even more time consuming when there are large numbers of participant with whom a user may desire to share a piece of captured media content. Although it is well known to send a single email to a large number of recipients and to send MMS messages to multiple destination telephone numbers, it still requires considerable effort to populate an addressee/recipient list and attach the media content. In addition, sending media content via various communication networks occupies various network resources, which can contribute to network congestion and impact other network services. In addition, sending media content to other users via such communication networks may increase usage charges for both sender and recipient, as well as risk the privacy of the communication as it is in transit and/or stored in various networks.

In contrast, the present disclosure provides a novel method for users to share the media content with such participants. For example, user 160, using mobile endpoint device 170 may capture media content, such as photograph 190, and desire to send the photograph 190, or a notification of the photograph 190, to one or more of participants 161-164. In one example, endpoint device 170 transmits the photograph 190 wirelessly in a particular direction (or field of view) of the camera at the time when the media content is captured. For example, the endpoint device 170 may use a directional antenna for sending wireless signals (e.g., radio frequency (RF) signals using Wi-Fi, Bluetooth, etc.). Similarly, if infrared or free-space optical communication is used, various components may be used to collimate the light/signal in a particular range and/or direction and to block the signal in other directions. Thus, regardless of the specific communication type, the endpoint device 170 may concentrate the transmission power of a signal in the desired range/direction while attenuating the transmission power of the signal elsewhere. In other words, the signal strength of the transmitted signal can be varied based on the direction of transmission.

Notably, it is possible that there is a delay between the capturing of the photograph 190 and when the photograph 190, or a notification of the photograph 190, is transmitted. Accordingly, it is possible that the user 160 may change the orientation of the endpoint device 170 during this time. As such, in one embodiment the endpoint device 170 may track such orientation changes in order to send the transmission in the direction in which the media content was captured at the earlier time. In one example, an accelerometer and gyroscope, a GPS receiver, a signal from a cellular base station, a compass and/or other components may be used by endpoint device 170 to determine the direction in which the media content is captured.

In one embodiment, the endpoint device 170 also estimates a distance to a subject, or subjects, of the photograph 190. For example, the endpoint device 170 may estimate the distance from the camera to one or more of the participants in the photograph 190 based upon a height of at least one participant in the photograph 190. Notably, although the heights of different persons can vary significantly, for purposes of the present disclosure, a sufficient accuracy may be achieved by assuming a height of an average person, an average adult, an average child and so forth. In another example, the endpoint device 170 may approximate the distance by determining the size of other common or known objects within the photograph 190, such as a wall outlet, a car, a stop sign, etc. In another example, endpoint device 170 may employ two or more cameras or sensors, e.g., to create three-dimensional image data. Thus, endpoint device 170 may calculate distance based upon the position of a same object in complimentary images obtained by each of the different cameras. In still another example, endpoint device 170 may estimate the distance by bouncing infrared, acoustic or other signals off of a target and calculating the distance based upon time between transmission and reception of a reflected signal.

It should be noted that although various examples are described with respect to a photograph 190, the same or substantially similar description is equally applicable to other types of media, such as videos, audio recordings and the like. For example, the same techniques may be used to estimate distance to one or more subjects in a video in the same manner described above in connection with photograph 190. Thus, any description herein of a photograph or other specific media type may also be broadly applicable to any other media type in accordance with the present disclosure.

In one embodiment, the endpoint device 170 may select a transmission power level based upon the distance that is determined. For example, the transmission power level may be selected such that the transmission can be received relatively free of error by receiving devices at the determined distance, while tapering off beyond such distance. Similarly, endpoint device 170 may also determine a range or field of view, e.g., in a number of degrees, of the photograph 190. For example, some endpoint devices may be equipped with cameras or camera lenses that are configurable to capture media with different fields of view, e.g., normal, widescreen, panorama, fish eye, etc. As such, in one embodiment endpoint device 170 may determine the field of view of the photograph 190 based upon the setting of the camera at the time the media content was captured/recorded. Thus, endpoint device 170 may tailor the direction and range of the transmission based upon such determinations.

In one example, endpoint device 170 does not employ a single communication technique for sending photograph 190 but may select from among multiple different methodologies. For example, if endpoint device 170 determines the distance to the subject(s) of the photograph 190 is within a few meters, it may select to use infrared or Bluetooth. If the distance is beyond a few meters, endpoint device 170 may instead choose to use Wi-Fi or free-space optical communication.

In one embodiment, the photograph 190 is encrypted prior to the transmission, where an encryption key may be provided to intended recipients at any time before, during or after the encrypted photograph 190 is transmitted. Notably, in one example, the encrypted photograph 190 is transmitted using a near-field and/or peer-to-peer communication, whereas the encryption key may be sent via a different channel, such as a text message, a multimedia message (MMS), an email, and so forth. Regardless of the specific communication type(s) that are used, the encryption key may be sent by endpoint device 170 to any one or more of devices 171, 172, etc., via cellular access network 140, core IP network 110, and so forth.

Notably, one or more of the user 160 and participants 161-164 may be a subscriber of cellular access network 140 and/or core IP network 110. For example, as mentioned above the cellular access network 140 and the core IP network 110 may be operated by the same service provider. Thus, in one embodiment database (DB) 121 of application server (AS) 120 in core IP network 110 may store profile information of one or more of user 160 and/or participants 161-164, e.g., users who are also network subscribers of cellular access network 140 and core IP network 110. Taking user 160 as an example, the profile information stored in DB 121 may include a name, billing address, service address, device identifier (e.g., an international mobile equipment identity (IMEI)), telephone number and email address associated with user 160. The profile information may also include geographic location information regarding user 160. For example, location information may be determined from a source IP address associated with communications from endpoint device 170 (e.g., if endpoint device 170 is using access network 150 for data services), global positioning system (GPS) information of device 170, serving base station information, and so forth.

The profile may also include a contact list of user 160. In one example, the contact list may include various different communication identities that can be used for different contacts. For example, the user 160 may have only a telephone number for one contact. However, for another contact the user may store a number of communication identities such as: a home telephone number, a cellular telephone number, a work telephone number, an email address, an instant messaging username, a VoIP application username, and so forth. In one example, participant 161 may also be a subscriber. Thus, DB 121 may store a similar profile for participant 161 and his/her device 171. Notably, user 160 may indicate that participant 161 is a friend/contact by including an entry for participant 161 in user 160's contact list.

In one embodiment, user 160 may request that cellular access network 140 and/or core IP network 110 distribute the encryption key only to known contacts of user 160 who are within a geofence, or a particular distance from the user 160. For example, as mentioned above, DB 121 may store current locations of different subscribers' endpoint devices. Thus, in one example, application server (AS) 120 may determine if the devices of any contacts of the user 160 are within a certain distance from user 160's endpoint device 170. In particular, DB 121 may store the location of endpoint device 170 in addition to the locations of one or more other devices, such as devices 171 and 172 of participants 161 and 162 respectively. As such, AS 120 may determine the relative distance between user 160 and participants 171 and 172.

In one example, subscribers may be required to opt-in in order for the network to be able to use device location information in accordance with the present disclosure. In one embodiment, AS 120 may forward the encryption key to any contacts meeting the location criteria via one or more modes of communication. For example, AS 120 may forward the encryption key to device 171 of participant 161 via cellular access network 140. In one embodiment, although user 160 may have certain contact identities of participant 161, AS 120 may forward the encryption key using any mode of its choosing. For instance, user 160 may be unaware of a Session Initiation Protocol (SIP) address of endpoint device 171. Nevertheless, AS 120 may send a SIP message to endpoint device 171 with the encryption key, without revealing to user 160 any further details of participant 161 and/or device 171 than user 160 already possesses.

Notably, in one example, any device of a contact of user 160 may receive the encryption key if the device is within a specified distance of endpoint device 170. However, it is possible that some contacts of user 160 are simply nearby, but are not participants in the photograph 190. Nevertheless, the present embodiments utilize directional transmission where transmission power or mode of transmission may be selected to target the communication to only devices within a particular range and/or distance. Thus, the possibility of contacts who are not participants receiving the photograph 190 is minimized. In particular, a receiving device must possess both the photograph 190 (which is encrypted) as well as the encryption key in order to obtain an original copy of the photograph. Further, the photograph 190 does not transit any of the networks 110, 140, 150 and so forth. Thus, the privacy of the first user's media content with respect to a communication network service provider is maintained, while reducing network load, data usage charges, and so forth.

In one example, contacts of user 160 may further be determined based upon social network information. For example, social network 130 may store member profiles for members of the social network. In one embodiment, the member profiles are stored in database (DB) 128 of application server (AS) 127 and include lists of contacts/friends of each member. In this example, user 160 and participants 161-164 may all be members of the social network 130. Participant 161 may be a contact or friend of user 160 within the social network 130. However, participant 162 may only be a contact/friend of participant 161. AS 120 may thus query the social network 130 for profile information regarding members of the social network to determine additional contacts of user 160. Therefore, contacts of user 160 identified from social network 130 may be added to contacts of the user 160 obtained through other means.

In one embodiment, user 160 may request that the encryption key be sent to both first and second degree contacts. For example, AS 120 may identify a friend-of-a-friend via contact list information and/or social network information of the user 160. Thus, AS 120 may further transmit the encryption key to the devices of any second-degree contacts, third-degree contacts, etc. within the geofence as specified by user 160. In one embodiment, contacts of user 160 who receive the encryption key may be permitted to forward the encryption key to any of their own friends/contacts. Thus, if participant 162 is not a contact of user 160 but is a contact of participant 161, he or she may still be able to obtain the encryption key if it is sent to participant 161 and if participant 161 chooses to forward the encryption key to participant 162.

In still another example, the endpoint device 170 may upload the photograph 190 to a network-based server, or data store, e.g., to AS120 and DB 121, AS125 and DB 126 and/or AS127 and DB 128. In this case, instead if transmitting the actual photograph 190 toward the participants in the direction from which the photograph 190 was captured using near-field and/or peer-to-peer communication, the endpoint device 170 may simply transmit a notification which indicates that the photograph 190 has been uploaded to the server. For example, the notification may indicate a destination (and possibly a file name) for the file from which the devices in the field of view may retrieve it. Thus, the devices of one or more of the participants in the media that receive this notification, e.g., devices 171 and 172, may know where to retrieve the photograph 190 if they so choose. However, the photograph 190 may still be encrypted prior to uploading to the server. In this case, the transmission and reception of an encryption key is still performed via one or more of the networks 140, 110, 150, etc., such that only known contacts of the user 160 who receive the notification may subsequently access the photograph 190 from the network-based server.

In one embodiment, user 160 may add a layer of security when uploading photograph 190 to a network-based server by requiring any devices requesting the photograph 190 to transmit their user's likeness in order to obtain access to the stored media. Facial recognition and/or other identification techniques may be used to match the provided likeness to a participant in the photograph 190. For example, in one embodiment the subscriber profile information and/or social network information may store subscribers' photographs. In addition, the network-based server may have access this additional information in order to perform likeness matching. In addition, in one embodiment the subscriber profile information and/or social network information may store subscribers' photographs. Thus, if a match is identified (and if the proper encryption key is provided), the user/device may be permitted to retrieve the photograph 190.

In one embodiment, instead of sending and receiving encryption keys via one or more communication networks, endpoint devices may exchange a shared key generating algorithm with one another peer-to-peer. As such, at a later time, any sent media content may be encrypted using a key generated via the shared algorithm and decrypted using the same key. In addition, in one embodiment endpoint device 170 may send a pre-notification in a direction of the camera prior to capturing a media content to place other devices on notice that a photograph is about to be taken, and to prepare to receive either the photograph or a notification of where to retrieve the photograph. In one example, this pre-notification may include the encryption key and/or a key generating algorithm. In one example, the pre-notification may indicate a server, a filename or other location and content identifiers to indicate where to obtain the captured media content. A later notice may then be sent which indicates only that the media content has been captured. In other words, the later notice need not include any location/content identifiers.

It should be noted that the system 100 has been simplified. For example, the system 100 may include other network elements (not shown) such as border elements, routers, switches, policy servers, security devices, gateways, administrator and user consoles, and so forth. Thus, FIG. 1 is only intended to illustrate one exemplary environment in which embodiments of the present disclosure may be employed.

Figure 2:
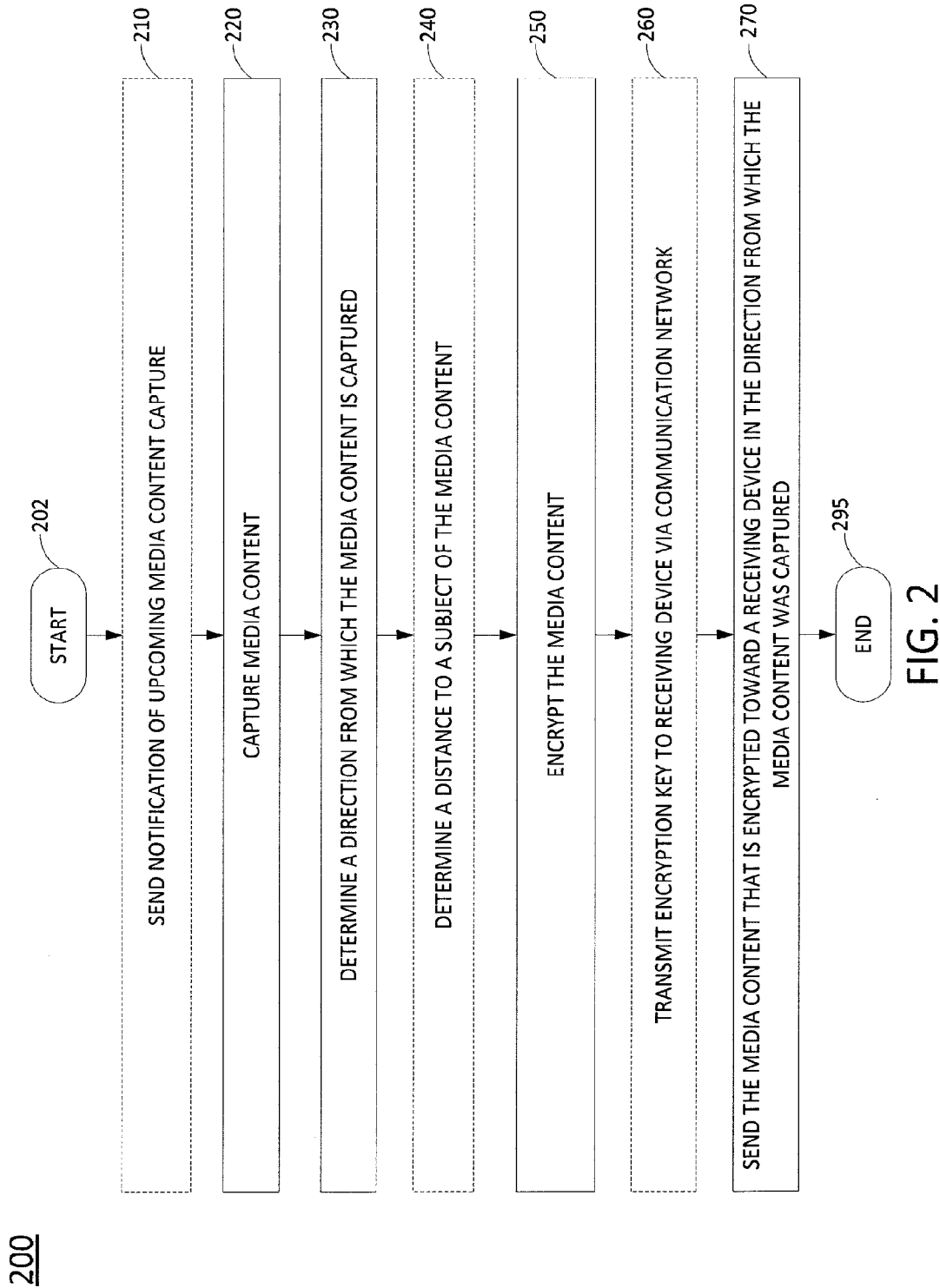
FIG. 2 illustrates a flowchart of a method for processing a media content, in accordance with the present disclosure.

FIG. 2 illustrates a flowchart of a method 200 for processing a media content. In one embodiment, steps, functions and/or operations of the method 200 may be performed by an endpoint device, such as mobile endpoint device 170 in FIG. 1. In one embodiment, the steps, functions, or operations of method 200 may be performed by a computing device or system 400, and/or processor 402 as described in connection with FIG. 4 below. For illustrative purpose, the method 200 is described in greater detail below in connection with an embodiment performed by a processor, such as processor 402.

The method begins in step 205 and proceeds to optional step 210.

At optional step 210, the method sends a notification of an upcoming media content capture. For example, the method may be implemented on an endpoint device of a user who is imminently prepared to take a photograph, record a video, etc. In one embodiment, the notification may be sent using near-field and/or peer-to-peer communication methods. In one embodiment, the notification is sent in a same direction as a direction in which the media content is to be captured, e.g., in a same direction and/or with a same range in which a camera is pointed.

At step 220, the method captures a media content. For example, the method may capture a photograph, audio recording and/or video at step 210 using a camera and/or a microphone of a smartphone, a digital camera or other multimedia device. For instance, the method may be executed on an endpoint device having such additional components.

At step 230, the method determines a direction from which the media content was captured. For example, as described above a user may change an orientation of an endpoint device after capturing the media content and before the media content is to be sent out. As such, the method may use a gyroscope and accelerometer, or other component as described above in connection with FIG. 1 in order to determine the direction in which the media content was first captured, e.g., in relation to a current orientation of the camera/endpoint device.

At optional step 240, the method determines a distance to a subject of the media content. For example, as described above a distance to a subject of the media content (e.g., a participant in the media content) may be determined by noting the size of a person or a common object in the media content and referencing an average size of a person, a known size of the common object, such as an automobile, and so forth. Other exemplary techniques for determining a distance are described above in connection with FIG. 1. For example, the distance may be determined by measuring the round trip time of an infrared or acoustic signal.

At step 250, the method encrypts the media content. For example, the processor may encrypt the media content using any known encryption technique. Notably, the method may store an encryption key which will allow any proper recipients of the media content that is encrypted to be able to access the original version of the media content.

At optional step 260, the method transmits the encryption key to a receiving device via a communication network. For example, as described above in connection with FIG. 1, the encryption key may be sent to devices of known contacts of a user of a device capturing the media content. In one example, the method sends the encryption key only to devices of known contacts of the user which are within a particular geofence, e.g., within a particular distance of the user's device. In one embodiment, the encryption key is sent via a cellular network and/or one or more other communication networks. In one embodiment, one or more components of the cellular network or other communication network determine geographic proximity of the processor and one or more devices of contacts of the user. Accordingly at step 260 the method may send instructions to one or more communication network-based components with a desired geofence radius and instructions to send the encryption key to any contacts' devices that meet the specified criteria.

At step 270, the method sends the media content that is encrypted toward a receiving device in the direction from which the media content was captured. For example, as described above, the media content may be sent using near-field and/or peer-to-peer communication. In addition, at step 230, the method may have determined a direction from which the media content was captured. Thus, regardless of whether a camera/endpoint device has been moved, the method may still transmit the encrypted media content toward the participants in the media. In one embodiment, a signal strength of transmission is selected based upon the distance to a subject of the media content that is determined at optional step 240. In one embodiment, a range (e.g., in degrees) of transmission is selected based upon a field of view of the captured media content. For example, depending upon the mode in use of a camera, e.g., normal, widescreen, panorama, etc., the method may select a range for sending the media content that is encrypted.

In one embodiment, the method may also select a mode of communication depending upon the distance that is determined at optional step 240. For example, if the method determines the range to the subject(s) of the media content is within a few meters, it may select to use infrared or Bluetooth. If the range is beyond a few meters, the method may instead choose to use Wi-Fi or free-space optical communication. In any case, only devices in the direction in which the encrypted media content is sent and which possess the proper encryption key may properly access the media content. Thus, at step 270 the method does not sent the encrypted media content to any specific receiving device, but only sends the encrypted media content in a particular direction toward participants in the media content.

Following step 270, the method 200 proceeds to step 295 where the method ends.

Figure 3:
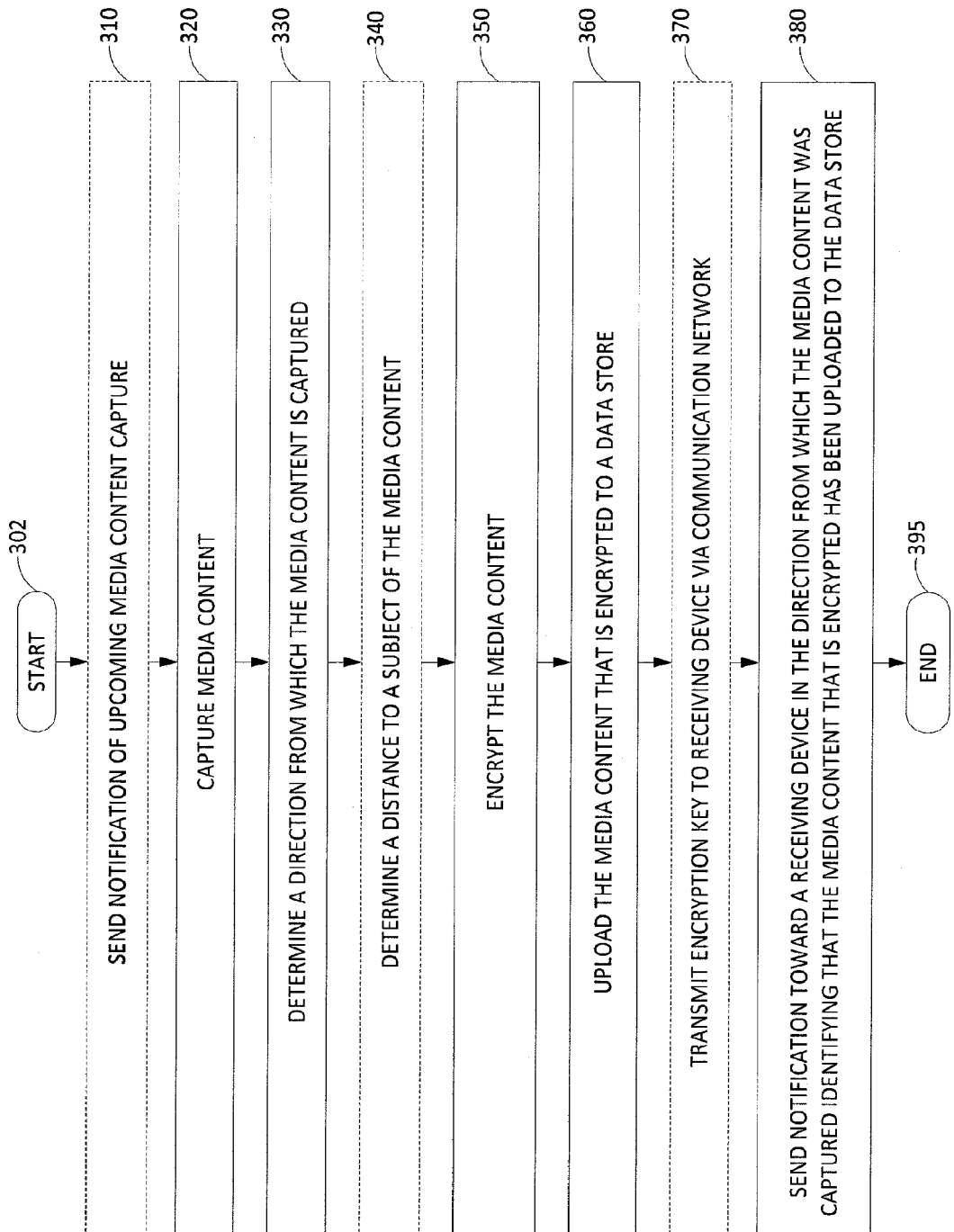
FIG. 3 illustrates a flowchart of another method for processing a media content, in accordance with the present disclosure.

FIG. 3 illustrates a flowchart of an additional method 300 for processing a media content. In one embodiment, steps, functions and/or operations of the method 300 may be performed by a mobile endpoint device, such as endpoint device 170 in FIG. 1. In one embodiment, the steps, functions, or operations of method 300 may be performed by a computing device or system 400, and/or processor 402 as described in connection with FIG. 4 below. For illustrative purpose, the method 300 is described in greater detail below in connection with an embodiment performed by a processor, such as processor 402.

The method begins in step 305 and proceeds to optional step 310.

At optional step 310, the method sends a notification of an upcoming media content capture. For example, the method may be implemented on an endpoint device of a user who is imminently prepared to take a photograph, record a video, etc. In one embodiment, the notification may be sent using near-field and/or peer-to-peer communication methods. In one embodiment, the notification is sent in a same direction as a direction in which the media content is to be captured, e.g., in a same direction and/or with a same range in which a camera is pointed.

At step 320, the method captures a media content. For example, the method may capture a photograph, audio recording and/or video at step 310 using a camera and/or a microphone of a smartphone, a digital camera or other multimedia device. For instance, the method may be executed an endpoint device having such additional components.

At step 330, the method determines a direction from which the media content was captured. For example, as described above a user may change an orientation of an endpoint device after capturing the media content and before the media content is to be sent out. As such, the method may use a gyroscope and accelerometer, or other component as described above in connection with FIG. 1 in order to determine the direction in which the media content was captured, e.g., in relation to a current orientation of the camera/endpoint device.

At optional step 340, the method determines a distance to a subject of the media content. For example, as described above a distance to a subject of the media content (e.g., a participant in the media content) may be determined by noting the size of a person or a common object in the media content and referencing an average size of a person, a known size of the common object, such as a wall outlet or an automobile, and so forth. Other exemplary techniques for determining a distance are described above in connection with FIG. 1. For example, the distance may be determined by measuring the round trip time of an infrared or acoustic signal.

At step 350, the method encrypts the media content. For example, the method may encrypt the media content using any known encryption technique. Notably, the method may store an encryption key which will allows any proper recipients of the media content that is encrypted to be able to access the original version. Notably, steps 310-350 of the method 300 and steps 210-250 of the method 200 may comprise the same or substantially similar functions.

At step 360, the method uploads the media content that is encrypted to a data store. For example, step 360 may comprise the functions described above in connection with FIG. 1 for uploading a media content (e.g., a photograph) to a network-based server.

At optional step 370, the method transmits the encryption key to a receiving device via a communication network. For example, step 370 may involve the same or substantially similar functions to those described above in connection with step 260 of the method 200.

At step 380, the method sends information pertaining to the media content towards a receiving device in the direction from which the media content was captured. Notably, step 380 may comprise substantially similar functions to those described above in connection with step 270 of the method 200. However, instead of sending the media content that is encrypted towards a receiving device (e.g., towards one or more participants in the media and their respective devices), at step 380 the method may send a notification of a destination (and possibly a file name) for the file from which the devices in the field of view may retrieve the media content. For instance, the information pertaining to the media content may identify a data store, e.g., a network-based server hosting the media content, along with a filename to specifically identify the media content. In addition, as described above in connection with FIG. 1, the transmission and reception of an encryption key may still be performed via a communication network, such that only known contacts or intended recipients who receive the notification may subsequently access the media content from the data store. In other words, any device requesting the media content from the data store must still possess the encryption key and/or present the encryption key to the data store in order to obtain an original copy of the media content.

Following step 380, the method 300 proceeds to step 395 where the method ends.

It should be noted that although not specifically specified, one or more steps, functions or operations of the respective methods 200 and/or 300 may include a storing, displaying and/or outputting step as required for a particular application. In other words, any data, records, fields, and/or intermediate results discussed in the respective methods can be stored, displayed and/or outputted to another device as required for a particular application. Furthermore, steps, operations or blocks in FIGS. 2 and 3 that recite a determining operation or involve a decision do not necessarily require that both branches of the determining operation be practiced. In other words, one of the branches of the determining operation can be deemed as an optional step. Furthermore, operations, steps or blocks of the above described methods can be combined, separated, and/or performed in a different order from that described above, without departing from the example embodiments of the present disclosure. In particular, an encryption key may be sent to desired recipients at any time before, during or after the capturing of a media content, the sending of the media content that is encrypted and/or the uploading of the media content that is encrypted to a data store.

Figure 4:
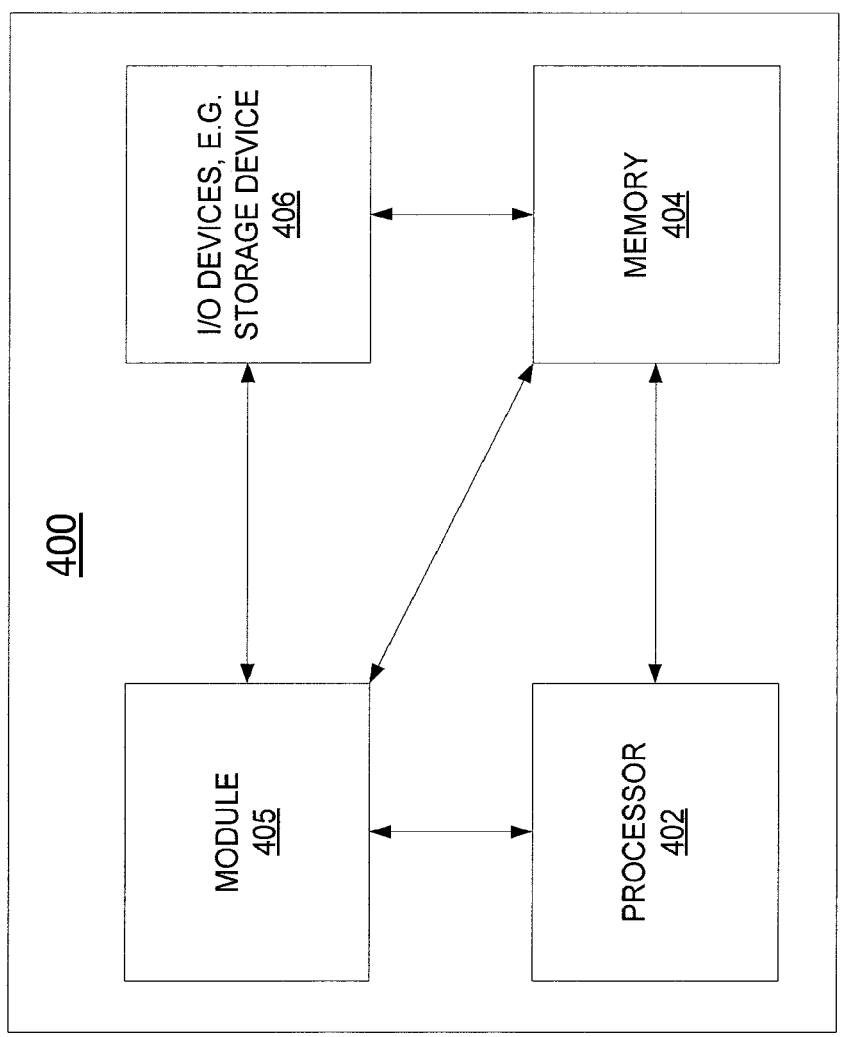
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a hardware processor element 402 (e.g., a central processing unit (CPU), a microprocessor, or a multi-core processor), a memory 404, e.g., random access memory (RAM) and/or read only memory (ROM), a module 405 for processing a media content, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed manner for a particular illustrative example, i.e., the steps of the above method(s) or the entire method(s) are implemented across multiple general-purpose computers, then the general-purpose computer of this figure is intended to represent each of those multiple general-purpose computers.

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps functions and/or operations of the above disclosed methods. In one embodiment, instructions and data for the present module or process 405 for processing a media content (e.g., a software program comprising computer-executable instructions) can be loaded into memory 404 and executed by hardware processor element 402 to implement the steps, functions or operations as discussed above in connection with the exemplary methods 200 and 300. The processor executing the computer readable or software instructions relating to the above described method(s) can be perceived as a programmed processor or a specialized processor. As such, the present module 405 for processing a media content (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server. In addition, it should be noted that the hardware processor can be configured or programmed to cause other devices to perform one or more operations as discussed above. In other words, the hardware processor may serve the function of a central controller directing other devices to perform the one or more operations as discussed above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a media content, the method comprising:
    capturing, by a processor of a mobile endpoint device, the media content, wherein the media content comprises an image or a video;
    determining, by the processor, a direction from which the media content is captured;
    determining, by the processor, a distance to a subject of the media content in accordance with a roundtrip time of a signal;
    detecting, by the processor, a change in an orientation of the mobile endpoint device; and
    sending, by the processor, the media content toward a receiving device in the direction from which the media content is captured in accordance with the distance to the subject of the media content using the change in the orientation of the mobile endpoint device that was detected, wherein the distance to the subject of the media content is used for selecting a communication technique from a plurality of communication techniques comprising an infrared communication technique, a Bluetooth communication technique, a wireless fidelity communication technique, and a free-space optical communication technique.

2. The method of claim 1, wherein the direction from which the media content is captured comprises a direction of a field of view of a camera.

3. The method of claim 1, wherein the direction from which the media content is captured is determined using an accelerometer and a gyroscope.

4. The method of claim 3, wherein the direction from which the media content is captured is further determined using a global positioning system.

5. The method of claim 3, wherein the direction from which the media content is captured is further determined using a signal from a cellular base station.

6. The method of claim 3, wherein the direction from which the media content is captured is further determined using a compass.

7. The method of claim 1, wherein the sending the media content toward the receiving device in the direction from which the media content is captured in accordance with the distance to the subject of the media content comprises adjusting a transmission strength based upon the distance to the subject of the media content.

8. The method of claim 1, wherein the determining the distance to the subject of the media content is further based upon a height of a person in the media content.

9. The method of claim 1, wherein the media content is sent toward the receiving device via a directional antenna.

10. The method of claim 1, wherein the media content is sent toward the receiving device via a peer-to-peer wireless communication using the communication technique.

11. A computer-readable storage device storing instructions which, when executed by a processor of a mobile endpoint device, cause the processor to perform operations for processing a media content, the operations comprising:
    capturing the media content, wherein the media content comprises an image or a video;
    determining a direction from which the media content is captured;
    determining a distance to a subject of the media content in accordance with a roundtrip time of a signal;
    detecting a change in an orientation of the mobile endpoint device; and
    sending the media content toward a receiving device in the direction from which the media content is captured in accordance with the distance to the subject of the media content using the change in the orientation of the mobile endpoint device that was detected, wherein the distance to the subject of the media content is used for selecting a communication technique from a plurality of communication techniques comprising an infrared communication technique, a Bluetooth communication technique, a wireless fidelity communication technique, and a free-space optical communication technique.

12. The computer-readable storage device of claim 11, wherein the direction from which the media content is captured comprises a direction of a field of view of a camera.

13. The computer-readable storage device of claim 11, wherein the direction from which the media content is captured is determined using an accelerometer and a gyroscope.

14. The computer-readable storage device of claim 13, wherein the direction from which the media content is captured is further determined using a global positioning system.

15. The computer-readable storage device of claim 13, wherein the direction from which the media content is captured is further determined using a signal from a cellular base station.

16. The computer-readable storage device of claim 13, wherein the direction from which the media content is captured is further determined using a compass.

17. The computer-readable storage device of claim 11, wherein the sending the media content toward the receiving device in the direction from which the media content is captured in accordance with the distance to the subject of the media content comprises adjusting a transmission strength based upon the distance to the subject of the media content.

18. The computer-readable storage device of claim 11, wherein the determining the distance to the subject of the media content is further based upon a height of a person in the media content.

19. The computer-readable storage device of claim 11, wherein the media content is sent toward the receiving device via a directional antenna.

20. A method for processing a media content, the method comprising:
- capturing, by a processor of a mobile endpoint device, the media content, wherein the media content comprises an image or a video;
- determining, by the processor, a direction from which the media content is captured;
- determining, by the processor, a distance to a subject of the media content in accordance with a roundtrip time of a signal;
- uploading, by the processor, the media content to a data store;
- detecting, by the processor, a change in an orientation of the mobile endpoint device; and
- sending, by the processor, a notification toward a receiving device in the direction from which the media content is captured in accordance with the distance to the subject of the media content using the change in the orientation of the mobile endpoint device that was detected, wherein the notification identifies that the media content has been uploaded to the data store, wherein the distance to the subject of the media content is used for selecting a communication technique from a plurality of communication techniques comprising an infrared communication technique, a Bluetooth communication technique, a wireless fidelity communication technique, and a free-space optical communication technique.

* * * * *